US012608311B1

(12) United States Patent
Tsai

(10) Patent No.: US 12,608,311 B1
(45) Date of Patent: Apr. 21, 2026

(54) IN-MEMORY BITWISE OPERATION CIRCUIT AND METHOD THEREOF

(71) Applicant: MACRONIX International Co., Ltd., Hsinchu (TW)

(72) Inventor: Wen-Che Tsai, Hsin-Chu City (TW)

(73) Assignee: MACRONIX International Co., Ltd., Hsinchu (TW)

( * ) Notice: Subject to any disclaimer, the term of this patent is extended or adjusted under 35 U.S.C. 154(b) by 0 days.

(21) Appl. No.: 18/921,024

(22) Filed: Oct. 21, 2024

(51) Int. Cl.
*G06F 12/00* (2006.01)
*G06F 12/02* (2006.01)

(52) U.S. Cl.
CPC ................................. *G06F 12/0246* (2013.01)

(58) Field of Classification Search
CPC .... G06F 12/0246; G06F 11/048; G06F 3/064; G06F 3/0604; G11C 11/419
USPC .......................................... 711/103
See application file for complete search history.

(56) References Cited

U.S. PATENT DOCUMENTS

| | | | |
|---|---|---|---|
| 2013/0070526 A1 | 3/2013 | Eun et al. | |
| 2017/0115884 A1* | 4/2017 | Bhalerao | G11C 11/5671 |
| 2018/0053545 A1* | 2/2018 | Son | G11C 7/08 |
| 2020/0356455 A1* | 11/2020 | Byun | G06F 12/0253 |

FOREIGN PATENT DOCUMENTS

| | | | | |
|---|---|---|---|---|
| KR | 20160039544 A | * | 4/2016 | G06F 9/3004 |
| TW | 202143067 A | | 11/2021 | |

OTHER PUBLICATIONS

Office Action of Taiwan Counterpart Application, issued on Sep. 2, 2025, p. 1-p. 8.
Congming Gao et al., "ParaBit: Processing Parallel Bitwise Operations in NAND Flash Memory based SSDs", MICRO '21: MICRO-54: 54th Annual IEEE/ACM International Symposium on Microarchitecture, Oct. 2021, pp. 1-12.
Shuangchen Li et al., "Pinatubo: A processing-in-memory architecture for bulk bitwise operations in emerging non-volatile memories", 2016 53nd ACM/EDAC/IEEE Design Automation Conference (DAC), Aug. 2016, pp. 1-6.
Abu Sebastian et al., "Temporal correlation detection using computational phase-change memory", Nature Communications, Oct. 2017, pp. 1-10.

(Continued)

*Primary Examiner* — Mardochee Chery
(74) *Attorney, Agent, or Firm* — J.C. PATENTS

(57) ABSTRACT

An in-memory bitwise operation circuit and method thereof are provided. The circuit includes a memory array, storing page data each having strings; a page buffer, storing the strings and selecting a portion of the strings as operands; a pop-count counter, receiving the operands and an operator flag, counting the number of bit 1 at corresponding bit positions of the operands, and generating a bitwise operation result corresponding to the operator; a bitwise operation processing unit, receiving and temporally storing the bitwise operation result, and outputting a final bitwise operation result when receiving a final result flag. In case that the operator is a last operator, the bitwise operation result is output as the final bitwise operation result. The circuit and method are suitable for 3D NAND flash memory that has high capacity and high performance.

20 Claims, 11 Drawing Sheets

(56)  References Cited

OTHER PUBLICATIONS

Chun-Hsiung Hung et al., "3D stackable vertical-gate Be-Sonos Nand flash with layer-aware program-and-read schemes and wave-propagation fail-bit-detection against cross-layer process variations", 2013 Symposium on VLSI Circuits, Aug. 2013, pp. 1-2.
Ahmed Dalalah et al., "New Hardware Architecture for Bit-Counting", Proceedings of the 5th WSEAS International Conference on Applied Computer Science, Apr. 2006, pp. 1-12.
Vivek Seshadri et al., "Ambit: In-Memory Accelerator for Bulk Bitwise Operations Using Commodity DRAM Technology", 2017 50th Annual IEEE/ACM International Symposium on Microarchitecture (MICRO), Oct. 2017, pp. 1-15.
Jisung Park et al., "Flash-Cosmos: In-Flash Bulk Bitwise Operations Using Inherent Computation Capability of NAND Flash Memory", arXiv:2209.05566v1 [cs.AR], Sep. 2022, pp. 1-19.

* cited by examiner

| Vector | Page | String | Bit | | | |
|---|---|---|---|---|---|---|
| | | | B0 | B1 | | Bk-1 |
| Vector_Pi_S0 | Pi | S0 | B0 | B1 | | Bk-1 |
| Vector_Pi_S1 | | S1 | B0 | B1 | | Bk-1 |
| | | | | | | |
| Vector_Pi_Sn-1 | | Sn-1 | B0 | B1 | | Bk-1 |
| Vector_Pj_S0 | Pj | S0 | B0 | B1 | | Bk-1 |
| Vector_Pk_Sn-1 | Pk | Sn-1 | B0 | B1 | | Bk-1 |

| Operator | Read data (202) | Operand filter (204) | | Operands selection rule (206) | Counting result v.s. bitwise operation result (208) | |
| | | selecting bit | masking bit | Operation between operand and filter | Logical output =0 | Logical output =1 |
| | | | | | Counting result of bit 1 | |
| NOT | Raw data | 1 | 0 | AND | >0 | =0 |
| OR | Raw data | 1 | 0 | AND | =0 | >0 |
| NOR | Raw data | 1 | 0 | AND | >0 | =0 |
| AND | Reversed raw data | 1 | 0 | AND | >0 | =0 |
| NAND | Reversed raw data | 1 | 0 | AND | =0 | >0 |
| XOR | Raw data | 1 | 0 | AND | Even number, LSB=0 | Odd number, LSB=1 |
| NXOR | Raw data | 1 | 0 | AND | Odd number, LSB=1 | Even number, LSB=0 |

FIG. 5

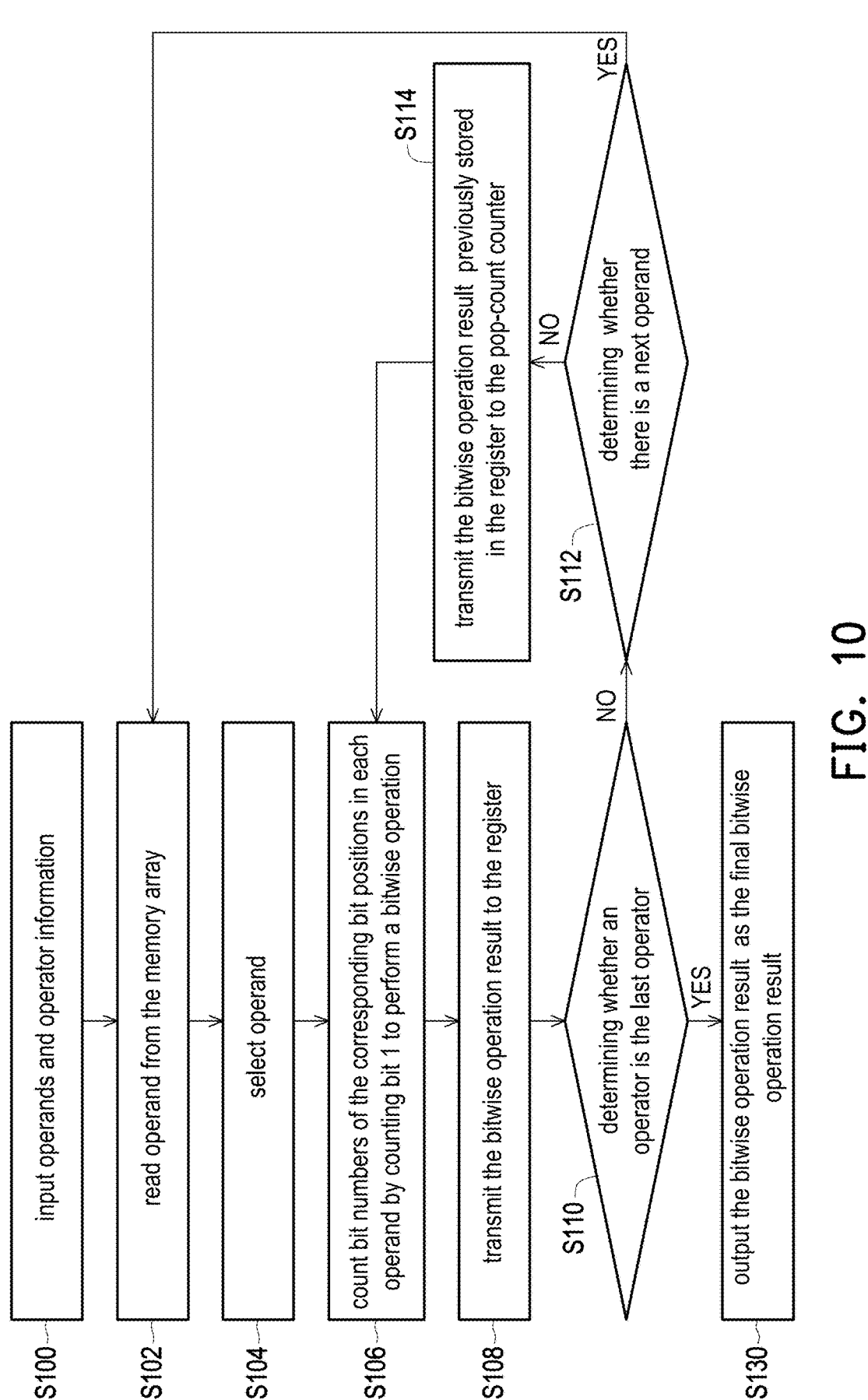

FIG. 10

S100 input operands and operator information

S102 read operand from the memory array

S104 select operand

S106 count bit numbers of the corresponding bit positions in each operand by counting bit 1 to perform a bitwise operation S108 transmit the bitwise operation result to the register S110 determining whether an operator is the last operator

NO

S112 determining whether there is a next operand

YES

S114 transmit the bitwise operation result previously stored in the register to the pop-count counter

NO

YES

S130 output the bitwise operation result as the final bitwise operation result

IN-MEMORY BITWISE OPERATION CIRCUIT AND METHOD THEREOF

BACKGROUND

Technical Field

The present disclosure relates to a bitwise operation technology, and in particular, to an in-memory bitwise operation circuit and a method thereof.

Description of Related Art

Bitwise operation is a computing method having a variety of applications. Suppose there are two operands with the same number of bits to perform logical operations, the operator compares each bit of the first operand with the corresponding bit of the second operand to obtain the logical operation result. Taking the AND operator as an example, if both bits are 1, the operation result of the corresponding bits of the two operands will be 1, otherwise the operation result will be 0.

There is a great diversity of applications of bitwise operations, such as bitmap index, image segmentation, etc. However, such bitwise operation is limited by energy and latency bottlenecks using existing von Neumann computing architectures. Generally speaking, when performing such bit operation, data will be read from non-volatile memory (such as flash memory), and then processed through the processor and DRAM memory. However, it often takes a lot of time to transfer data from the non-volatile memory to other external processing units for calculation. In particular, in today's image processing, AI processing, etc., the amount of data is large, so performing bulk bitwise operations takes a lot of time.

There is also a technology called computing in memory that is currently being developed. Therefore, through computing in memory, when data is read, logical operations may be performed in the memory before outputting. Therefore, the time for performing bitwise operations may be greatly shorten.

Therefore, how to modify the existing memory structure to perform bitwise operations in the memory without changing or minimally modifying the memory structure is an issue to be overcome.

SUMMARY

Based on the above description, according to an embodiment of the present disclosure, an in-memory bitwise operation circuit is provided. The in-memory bitwise operation circuit includes a memory array, a page buffer, a pop-count counter and a bitwise operation processing unit. The memory array has a plurality of page data, each of the plurality of page data has a plurality of strings. The page buffer stores the plurality of strings and selects a portion of the plurality of strings as a plurality of operands. The pop-count counter receives the plurality of operands and an operator flag, counts the number of bit 1 at corresponding bit positions of each of the plurality of operands based on the operator flag, and generates a bitwise operation result of the operator corresponding to the operator flag. The bitwise operation processing unit receives and temporally stores the bitwise operation result, and outputs a final bitwise operation result when receiving a final result flag. When the operator is a last operator, the bitwise operation result is output as the final bitwise operation result. When the operator is not the last operator, the bitwise operation result is transmitted to the pop-count counter, so that the pop-count counter continues to perform bitwise operations for a next operator.

According to another embodiment of the present disclosure, an in-memory bitwise operation method is provided. The method is executed in the memory device. The in-memory bitwise operation method at least includes the following steps. At least one page data having a plurality of strings is read from a memory array in the memory device. A portion of the strings is selected from the plurality of strings as a plurality of operands. Based on the operator to be executed, the number of bit 1 at corresponding bit positions of each of the plurality of operands is counted, and a bitwise operation result corresponding to the operator is generated. The bitwise operation result is received and temporally stored, when the operator is the last operator, the bitwise operation result is output as the final bitwise operation result. When the operator is not the last operator, the bitwise operation result is continuously used as the operand for a next operator to perform the counting of the number of bit 1, and the bitwise operation of the next operator is continued.

Based on the above embodiments, the in-memory bitwise operation of the disclosure uses the existing reading scheme to read the required operand (page data), and uses the existing error bit counter as the pop-count counter to perform bitwise operation. Therefore, it is possible to achieve the technical purpose of computing in memory and to effectively perform in-memory bitwise operation without having to significantly redesign the existing memory architecture and operation methods.

BRIEF DESCRIPTION OF THE DRAWINGS

FIG. 3A and FIG. 3B illustrate the configuration of each operand data based on an embodiment of the present disclosure.

FIG. 5 is a diagram illustrating the relationship between the operation results of various logical operations, the oper- and filter and counting of bit 1 according to an embodiment of the present disclosure.

FIG. 10 is an operation flow chart of an in-memory bitwise operation according to an embodiment of the present disclosure.

DESCRIPTION OF THE EMBODIMENTS

The in-memory bitwise operation architecture of the disclosure may perform massive bitwise operations in a memory without significantly modifying the existing memory architecture while using the existing reading method. Here, massive means that the number of bits (also called vector dimensions or bit string length) of each operand is quite large, for example, the number of bits may be 1 KB or more.

Figure 1:
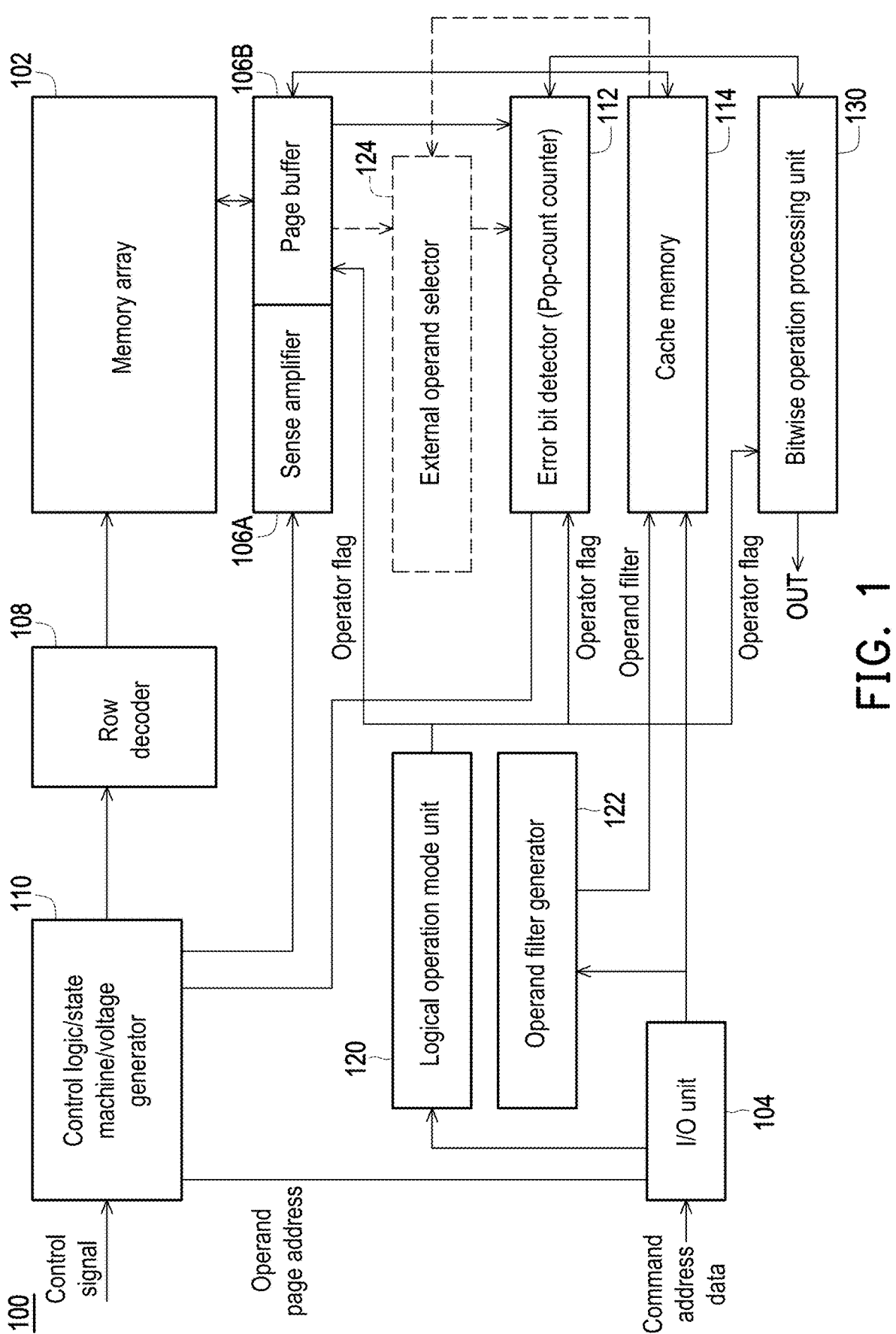
FIG. 1 is an architectural schematic diagram of an in-memory bitwise operation according to an embodiment of the present disclosure.

FIG. 1 is an architectural schematic diagram of an in-memory bitwise operation according to an embodiment of the present disclosure. As shown in FIG. 1, FIG. 1 illustrates the overall architecture of the in-memory bitwise operation circuit 100 of this embodiment. The in-memory bitwise operation circuit 100 may include a basic memory circuit (memory device) and additional bitwise operation-related circuits. The memory circuit comprises, for example, a memory array 102, an I/O unit 104, a sense amplifier 106A, a page buffer 106B, a row decoder 108, a control logic/state machine/voltage generator 110, an error bit detector 112 and a cache memory 114. Circuits related to bitwise operation include, for example, a logical operation mode 120, an operand filter generator 122, and a bitwise operation processing unit 130.

As illustrated in FIG. 1, the disclosure does not dramatically change the existing memory circuit architecture. As illustrated in FIG. 1, the method to read data from the memory array 102 is basically performed through the sense amplifier 106A, the page buffer 106B, etc. Therefore, the bitwise operation circuit 100 of the present disclosure does not require dramatic redesign of the existing memory circuit.

The memory array 102 comprises, for example, a flash memory, and includes an array type in which a plurality of memory cells is arranged in columns and rows. The memory array 102 may be a two-dimensional or three-dimensional memory. For example, the memory array 102 may use 3D NAND flash memory, which is characterized by high capacity and high performance. The I/O unit 104 may receive commands, addresses, data, etc. from outside the memory circuit. The commands, addresses and data received by the I/O unit 104 may be transmitted to each required functional unit of the memory circuit.

The sense amplifier 106A is coupled to the memory array 102 and is configured to sense and read data stored in the memory array 102. In addition, the page buffer 106B is a read buffer and the data sensed by the sense amplifier 106A may temporarily store in the page buffer 106B. As an example, the sense amplifier 106A and the page buffer 106B may be integrated into a functional unit. In addition, according to the existing architecture of the page buffer 106B, the disclosure use the page buffer 106B to select bits for the bitwise operation, which will be further described later.

The error bit detector 112 is generally used to determine whether the data can pass program verification after programming the memory array 102. During verification, the data to be programmed and the data written in the memory cells are bit-by-bit compared. If both are matched or mismatched, 0 or 1 will be obtained and stored in the corresponding page buffer, respectively. It means an error bit is represented by 1. When the counting of the error bits is detected to be higher than the predetermined error bit number, it may be determined that the program operation has failed, and vice versa, it may be determined that the program operation has been successful. Therefore, the error bit detector 112 has the function of counting the number of bit 1. Therefore, the disclosure configures the error bit detector 112 to function as a pop-count counter based on the counting function of bit 1 of the error bit detector 112. The pop-count counter is configured to count the number of bit 1 in a bit string. Accordingly, the number of bit 1 may be counted according to the bits in the data received from the page buffer 106B. Afterwards, bitwise operations may be performed based on the result, which will be further explained later.

In addition, there are two types of existing error bit detectors 112: analog type and digital type. The error bit detector 112 of the disclosure may be an existing error bit detector that adopts either the analog type or the digital type. Therefore, the specific circuit description of the error bit detector 112 is omitted in the embodiment of the disclosure, which will not affect the understanding of the structure of in-memory bitwise operation of the disclosure. The analog type error bit detector 112 may determine whether the generated error bits exceed a preset value based on the current value of each error bit generated. The digital type error bit detector 112 may substantially count the number of error bits accurately. However, either type of error bit detector 112 may be applied to the pop-count counter 112 of the disclosure without changing the internal design thereof.

The row decoder 108 decodes the address data received from the I/O unit to generate a row address. For example, the desired page and word line of the memory array may be selected from the memory array 102 based on the row address. The control logic/state machine/voltage generator 110 may be an integrated unit or an independent functional block, which inputs control commands to the memory array, generates the state of the memory array, and generates various voltage values required to operate the memory array 102. The row decoder 108 and the control logic/state machine/voltage generator 110 are also part of the existing memory circuit. The in-memory bitwise operation 100 of the present disclosure does not limit the specific architecture of this configuration. Those skilled in the art may make appropriate modifications or changes according to the memory circuit used.

The cache memory 114 may temporarily store data received by the I/O unit. For example, when each memory cell of the memory array 102 is to be programmed, the data to be programmed may be temporarily stored in the cache memory 114, and then the data may be written to the memory array 102 according to the decoding of the row and column addresses. In addition, the cache memory 114 may also be used to temporarily store operand filters required for in-memory bitwise operations. This part will be explained further later.

According to an embodiment of the disclosure, as described above, when in-memory operations are to be performed, the disclosure adds a logical operation mode unit 120, an operand filter generator (filter generator) 122, and a bitwise operation processing unit 130 to the existing memory circuit.

The logical operation mode unit 120 may generate corresponding operator flags according to the instructions of logical operators transmitted from the I/O unit. The operator flag is, for example, a flag that may correspond to various logical operators such as AND, OR, NOT, NOR, NAND, XOR, and XNOR. The operator flag is sent to the page buffer 106B, the pop-count counter 112 and the bitwise operation processing unit 130. Accordingly, after counting the number of bit 1 of the data from the page buffer 106B, the pop-count counter 112 may use the corresponding judgment formula (described in detail later) to generate the corresponding result to the bitwise operation processing unit 130 according to the type of logical operation indicated by the operator flag.

In addition, the bitwise operation processing unit 130 also generates corresponding bitwise operation output results based on the operator flag and the output of the pop-count counter 112. As an example, after the pop-count counter 112 performs a corresponding logical operation on the operand based on the operator flag, the bitwise operation result is output to the bitwise operation processing unit 130. When there is no need to perform corresponding logical operations on operands based on the next operator flag based on the bitwise operation result, the bitwise operation processing unit 130 may directly output the bitwise operation result. In addition, as another example, when there is a next operator flag, the bitwise operation result sent to the bitwise operation processing unit 130 will be sent to the pop-count counter 112 again, and the corresponding logical operation is performed on operand based on the next operator flag. This operation continues until the next operator flag is not received.

According to an embodiment of the present disclosure, the in-memory bitwise operation circuit 100 may further comprise an operand filter generator (filter generator) 122, which is configured to generate an operand filter. When several strings of the page do not need to be used as operands for operations, the operand filter may be used to mask several specific strings of the page. As explained in the following embodiments, the operand filter may be a data string with a string length equals to the number of strings in a page. As an example, a bit value of 1 may be used to represent that the corresponding string in the page is selected (selecting string), and a bit value of 0 may be used to represent that the corresponding string in the page is "don't care" or not selected (masking string), that is, the string is masked. In this way, some bits in the operand may be masked and filtered by performing a bitwise operation (such as an AND operation) on the page and the operand filter. Therefore, when only a few string in the read page need to be subjected to the bitwise operation, the operand filter generator 122 may be used to generate a corresponding operand filter to select strings from the read page.

In addition, the in-memory bitwise operation circuit 100 may further include an external operand selector 124 and the like. The external operand selector 124 is another method of performing operand selection. That is, the raw page data and the operand filter may be provided to the external operand selector 124. The external operand selector 124 can select the strings in the page data that is read and stored in the page buffer 106B for bitwise operation based on a filter input instruction from the outside. For example, in the above manner, the AND gate may also be used to perform AND operations on the read page and the operand filters to select strings from the page, and the selected results are sent to the pop-count counter 112.

Figure 2:
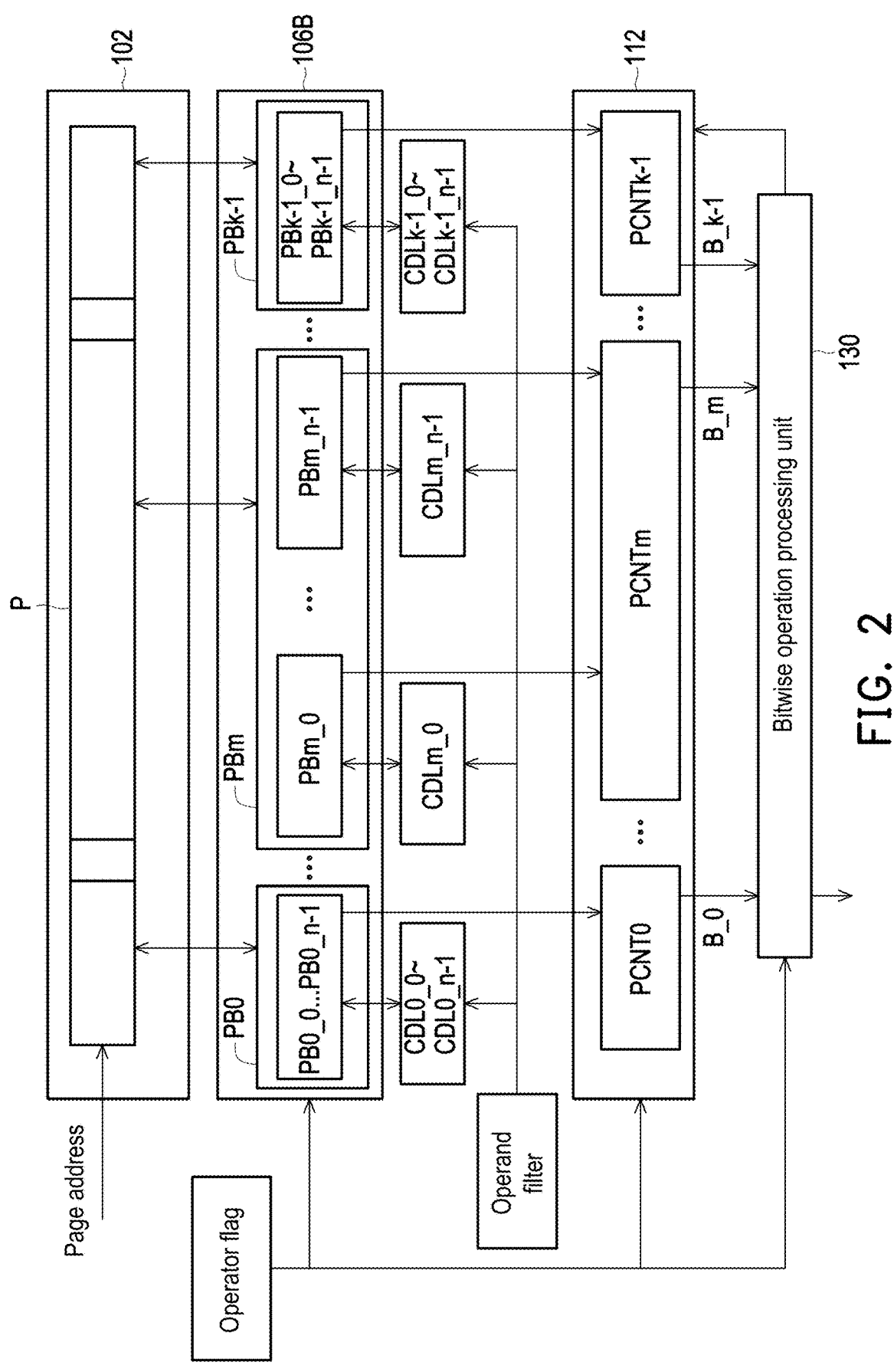
FIG. 2 is a conceptual diagram based on FIG. 1 that further illustrates the in-memory bitwise operation according to an embodiment of the present disclosure.

FIG. 2 is a conceptual diagram based on FIG. 1 that further illustrates the in-memory bitwise operation according to an embodiment of the present disclosure. As shown in FIG. 2, the memory array 102 may store page data P in units of page. Based on the page address input from the I/O unit 104, the sense amplifier 106A shown in FIG. 1 may read the page data P based on the page address, and the read page data P is temporarily stored in the page buffer 106B. Reading one page may simultaneously read the data stored in each memory cell on the same word line. Here, assuming that one page may have p bits, one page may have n strings (or vectors), then one string may have k bits (k=p/n). Each string may be regarded as an operand. In addition, the subsequent page buffer 106B and the pop-count counter 112 may also comprises k units accordingly.

Under the above architecture, the page buffer 106B may include multiple page buffer units (k in this example) PB0, . . . , PBk–1. As shown in FIG. 2, each of the k page buffer units stores corresponding bit positions in each string (operand). For example, among the k page buffer units, the page buffer unit PB0 stores the bit value of bit position 0 of each string, that is, PB0_0, . . . . PB0_*n*–1 (each page buffer unit contains n strings); the page buffer unit PBm stores the bit value of the bit position m of each string, that is, PBm_0, . . . . PBm_n–1 (each page buffer unit contains n strings); the page buffer unit PBk–1 stores the bit value of the bit position k–1 of each string, that is, PBk–1_0, . . . . PBk–1_n–1 (each page buffer unit contains n strings). And each string has k bits.

In addition, the operand filter generated by the operand filter generator 122 of FIG. 1 is first stored in the cache memory 114 and then provided to the page buffer 106B. As shown in FIG. 2, each page buffer unit PB0, . . . , PBk–1 (k units) in the page buffer 106B respectively receives the corresponding operand filters CDL0_0 to CDL0_*n*–1 (n bits), . . . , CDLk–1_0 to CDLk–1_n–1 (n bits). The number of bits of each operand filter CDLm_0 to CDLm_n–1 (m=0 to (k–1)) is substantially the same as the number of bits (0 to (n–1)) of each page buffer unit PBm (m=0 to (k–1)). Therefore, the above method may be used to utilize the bit value of each operand filter CDLm_0 to CDLm_n–1 being 0 or 1 to mask the bits PBm_0, . . . , PBm_n–1 (m=0 to (k–1)) of the corresponding page buffer unit PBm (m=0 to (k–1)).

Similarly, under the above architecture, the pop-count counter 112 may include multiple pop-count counter units (k in this example) PCNT0, . . . , PCNTk–1. As shown in FIG. 2, the pop-count counter unit PCNTm (m=0 to (k–1)) will count the number of bit 1 on the bits of each string in the corresponding page buffer unit PBm (m=0 to (k–1)). Afterwards, based on the operator flag, the corresponding logical operation may be performed in the count result of bit 1 to obtain the bitwise operation result B_0 to B_k–1. The bitwise operation result B_0 to B_k–1 is then output to the bitwise operation processing unit 130. Here, each pop-count counter unit PCNTm (m=0 to (k–1)) adopts an existing error bit detector to count the number of bit 1.

Then, when there is no need to use the bitwise operation result to further perform corresponding logical operations on operand based on the next operator flag, the bitwise operation processing unit 130 may directly output the bitwise operation result as the bitwise operation output OUT. On the contrary, when there is the next operator flag, the bitwise operation result sent to the bitwise operation processing unit 130 will be sent to the pop-count counter 112 again, and corresponding logical operations will be performed on the operand based on the next operator flag. The operation continues until the next operator flag is not received.

Figure 3B:
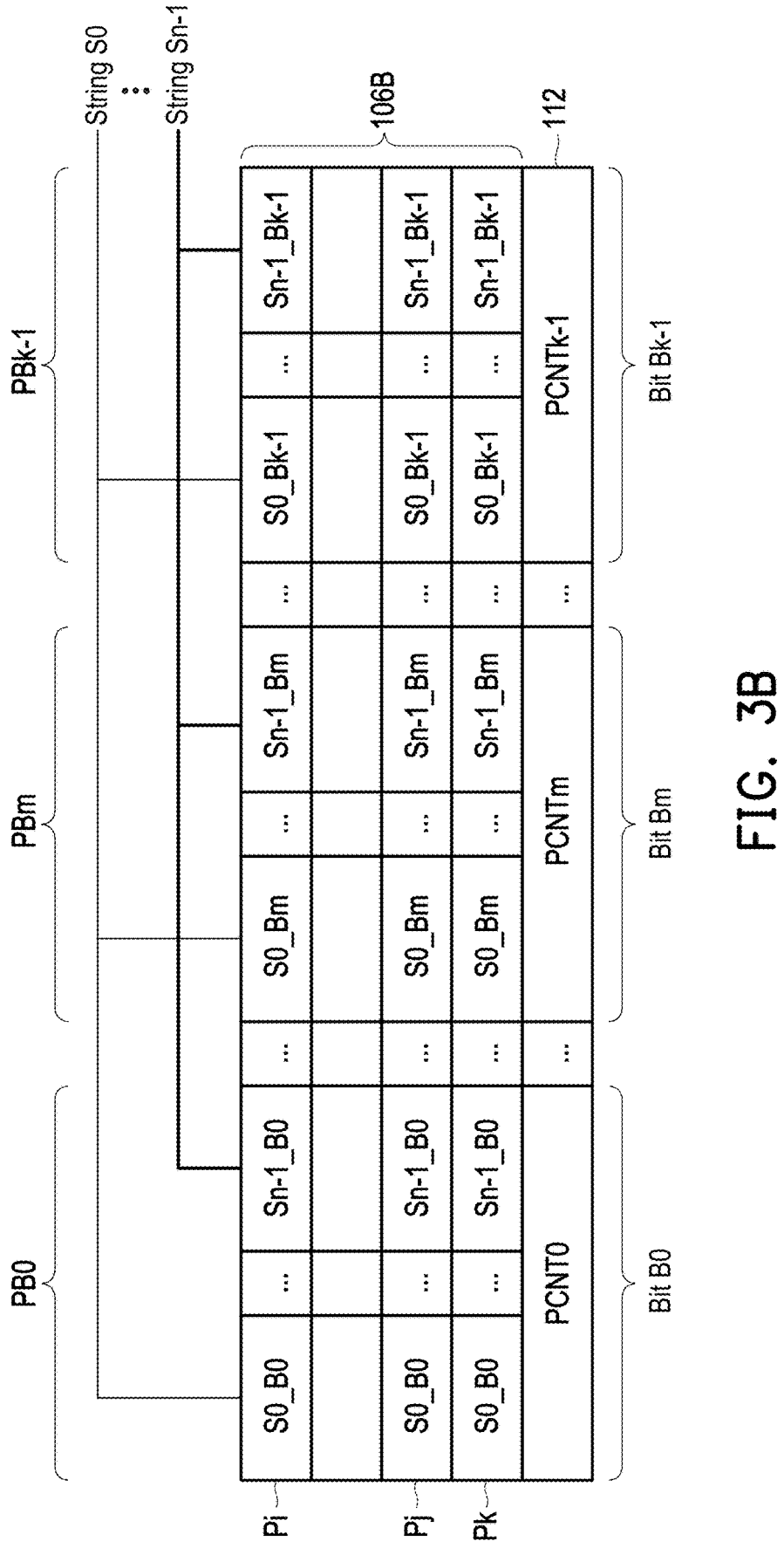

FIG. 3A and FIG. 3B illustrate the configuration of each operand data based on an embodiment of the present disclosure. FIG. 3A illustrates the structure of page data. As shown in FIG. 3, page data is read from the memory array 102 based on the page address. As mentioned above, the data of one page is, for example, on a word line, and the page (word line) may include multiple strings. Each string may be defined as a vector. In this example, one page Pi may include a plurality of strings S0 to Sn−1, i.e., n strings. Therefore, one page Pi may contain n vectors Vector_Pi_S0 to Vector_Pi_Sn−1.

Here, n strings S0 to Sn−1 may be the operand of the object to be processed. In addition, each string S0 to Sn−1 may include k bits, that is, bit Bm, (m is 0 to (k−1)). Therefore, the capacities of the page buffer unit PBm (m=0 to (k−1)) and the pop-count counter unit PCNTm (m=0 to (k−1)) shown in FIG. 2 are both n bits. Likewise, the page data Pj and Pk may also include vectors Vector_Pj_S0, Vector_Pk_Sn−1, etc. (only a part of them is listed).

Next, according to the embodiment of the disclosure, in order for the pop-count counter 112 to count bit 1 by the way of counting error bits, the above-mentioned vectors or strings of each page should be configured in each page buffer unit PBm (m=0 to (k−1)) in an appropriate manner. Therefore, as shown in FIG. 3B, the corresponding bit position Bm (m=0 to (k−1)) in each string S0 to Sn−1 is configured to be arranged in the same page buffer unit PBm (m=0 to (k−1)).

For example, the corresponding bit position B0 in each string S0 to Sn−1 is configured to be arranged in the page buffer unit PB0, the corresponding bit position Bm in each string S0 to Sn−1 is configured to be arranged in the page buffer unit PBm, and the corresponding bit position Bk−1 in each string S0 to Sn−1 is configured to be arranged in the page buffer unit PBk−1. In this way, as shown in FIG. 3B, the corresponding bit positions B0, . . . , Bm, . . . , Bk−1 in each string S0 to Sn−1 may be configured to be arranged in the corresponding page buffer units PB0, . . . , PBm, . . . , PBk−1.

Thereafter, each string S0 to Sn−1 in the page buffer units PB0, . . . , PBm, . . . , PBk−1 is transmitted to the corresponding pop-count counter unit PCNTm (m=0 to (k−1)) after selection of strings. In this way, each pop-count counter unit PCNTm (m=0 to (k−1)) may count the number of bit 1 for each bit Bm with the same position in each string Sr (r=0 to (n−1)). Thereafter, according to the operator flag, the corresponding judgment formula is used to perform the logical operation corresponding to the operator flag.

Therefore, as mentioned above, according to the embodiment of the disclosure, the bit data of each string in each page is placed in the appropriate page buffer unit PBm in an appropriate manner without changing the existing memory architecture. The existing error bit detector may be used as the pop-count counter 112. In this way, in-memory bitwise operation may be achieved.

Figure 4:
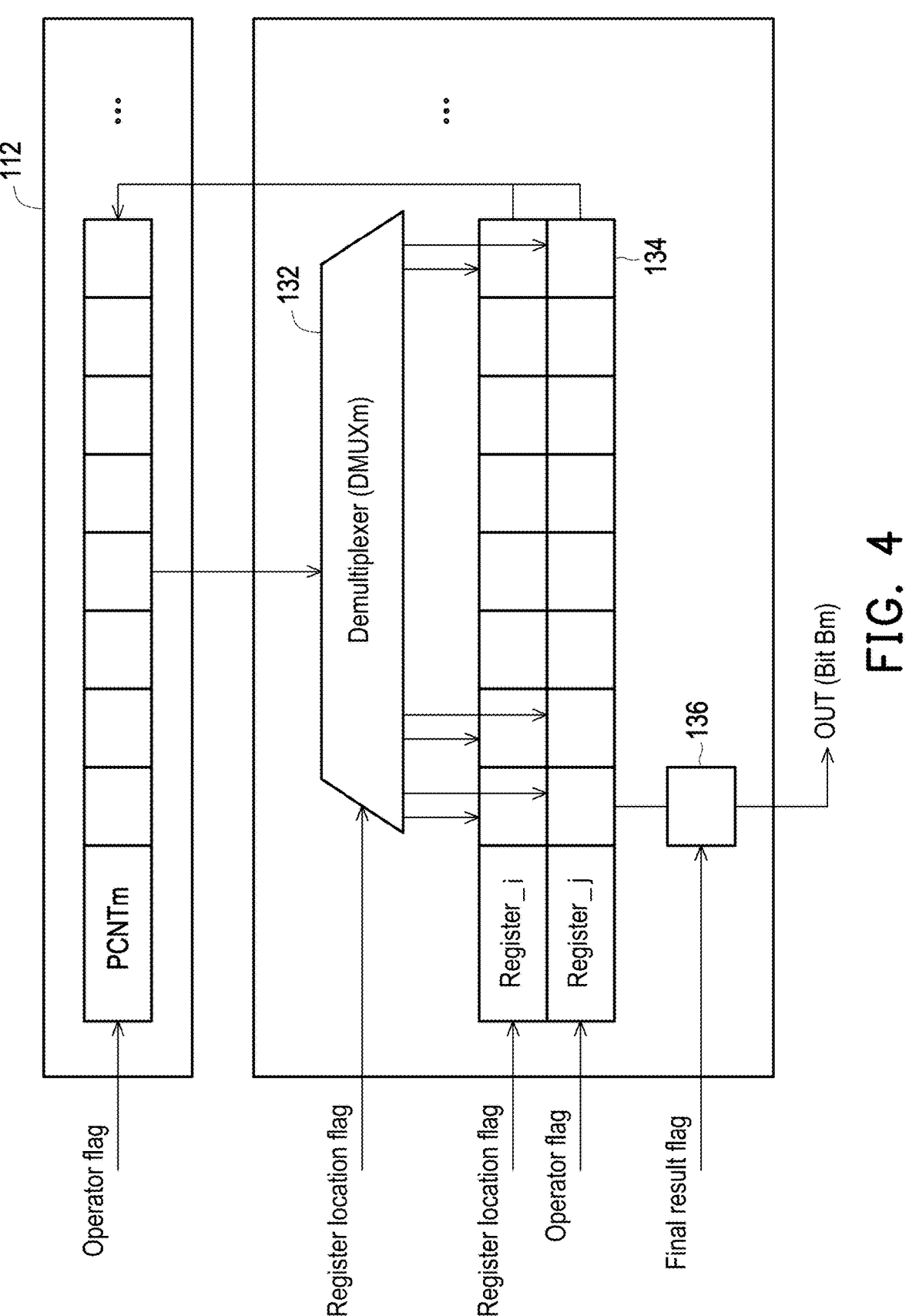
FIG. 4 is a schematic diagram of a bitwise operation processing unit according to an embodiment of the present disclosure.

FIG. 4 is a schematic diagram of a bitwise operation processing unit according to an embodiment of the present disclosure. As shown in FIG. 4, the bitwise operation processing unit 130 may also be composed of multiple processing units, each of which corresponds to a pop-count counter unit PCNTm (m=0 to (k−1)). Therefore, the bitwise operation processing unit 130 has k processing units. Each processing unit may have a demultiplexer 132, a plurality of registers 134, and an output buffer 136. In this example, the demultiplexer (DMUXm) 132 is corresponding to the pop-count counter unit PCNTm of the pop-count counter 112. As mentioned above, the pop-count counter unit PCNTm transmits the bitwise operation result B_m to the bitwise operation processing unit 130.

Here, the plurality of registers 134 take the register_i and the register_j shown in FIG. 4 as examples. The plurality of registers 134 may be used to store the operands (been operated) from the pop-count counter unit PCNTm. As an example, the demultiplexer (DMUXm) 132 may deliver the output from PCNTm into a corresponding register location based on the register location flags. The output buffer 136 may temporarily store the results of the bitwise operation. When the output buffer 136 receives the final result flag, the operation result temporarily stored in the output buffer 136 is output as a bitwise operation output OUT.

According to the embodiment of the present disclosure, the bitwise operation may be applied to a single level bitwise operation or a multi-level bitwise operation, that is, the bitwise operation involves multiple logical operations. In the case of single level bitwise operation, the operation result (counting the number of bit 1) of the pop-count counter 112 may be subjected to one operation of the operator. Therefore, the processed operands do not need to be used again. Under the circumstances, the operation result of the pop-count counter 112 may be transmitted to each output buffer 136 through each demultiplexer 132 of the bitwise operation processing unit 130. After the final result flag is sent to each output buffer 136, each output buffer 136 outputs the logical operation result of each bit Bm.

On the contrary, in the case of multi-level bitwise operation, the bitwise operation is still not finished after the operation result (counting the number of bit 1) of the pop-count counter 112 is subjected to one operation of the operator. Under the circumstances, the operand has to be subject to the next logical operation again. In this case, when the operator flag is presented as the next operator, the pop-count counter 112 transmits the operand (which may be one or more) operated in the previous level to each demultiplexer 132 of the bitwise operation processing unit 130. Each demultiplexer 132 transmits the operand to the corresponding register location based on the register location flag. Thereafter, the operand stored in the register is transmitted again to each pop-count counter unit PCNTm of the pop-count counter 112 (see FIG. 2) to perform the next level of bitwise operation. Through the bitwise operation processing unit 130, the bitwise operation method described in the embodiment of the disclosure may be applied to single level or multi-level bitwise operation.

In other words, the plurality of registers 134 in the bitwise operation processing unit 130 are used to store the temporary results of the previous level of operation, and transmit one or more operands from the previous level to the pop-count counter 112 to perform the next level of operation. Alternatively, when there is no next-level operation, the operation result may be transmitted to the output buffer 136 as preparation for outputting the final result.

Several examples will be given below with reference to FIG. 1 to illustrate how to perform in-memory bitwise operation using the above circuit architecture.

First, take the OR operation shown in Table 1 as an example. Assume that the read raw data has 4 strings (for example, stored in the page buffer 106B). In this example, the operand bit Bm from these 4 strings in page buffer unit PBm is 0101. Under the circumstances, if the bitwise operation only requires the first two strings and the latter two strings are not needed, the operand filter generated by the operand filter generator 122 may be used to mask the latter two bits. For example, the operand filter may set the selected strings to 1, and the strings not cared are set to 0. In this case, the operand filter is 1100.

Then, in the page buffer 106B, the latches provided inside the page buffer 106B are used. The following is a simple example for illustration. Assume that for bit Bm, the page buffer unit PBm of the page buffer 106B has a latch A, a latch B and a latch D. Under the circumstances, the bits Bm of the strings S0 to Sn−1 of a certain page are read from the memory array 102 (refer to the description of FIG. 3B), and the bits Bm of the strings S0 to Sn−1 are respectively read into the latch D. In addition, the operand filter generated from the operand filter generator 122 is transmitted to the latch B of the page buffer unit PBm via the cache memory 114. Then, the corresponding bits of the latch D and the latch B are subjected to AND operation to perform bit selection of the operands.

Then, the pop-count counter 112 will count the bit 1 in the data of selected operands transmitted from the page buffer 106B, which is 0100 in this example. The pop-count counter 112 adopts the existing error bit detector, so the pop-count counter 112 counts the number of bits with a value of 1. Under the conditions, the bitwise operation processing unit 130 outputs the result of the OR operation according to the number of 1 output by the pop-count counter 112. Because according to the OR operation, as long as one input is 1, the output will be 1; if the inputs are all 0, the output will be 0. Therefore, if the counted number of 1 is 0, the output of the OR operation is 0; conversely, if the counted number of 1 is greater than 0, the output of the OR operation is 1.

TABLE 1

| Raw data (operands) | | | 0 | 1 | 0 | 1 |
|---|---|---|---|---|---|---|
| Read raw data | | | 0 | 1 | 0 | 1 |
| Operand filter | selecting bit = 1, masking bit = 0 | | 1 | 1 | 0 | 0 |
| Select operands | (raw data) AND (operand filter) | | 0 | 1 | 0 | 0 |
| Count bit 1 | =0 | >0 | Selected | Not | | |
| Output of OR operation | 0 | 1 | | selected | | |

Next, take the NOT operation shown in Table 2-1 as an example. Assume that the read raw data has 4 strings. In this example, the operand bit Bm from these 4 strings in page buffer unit PBm is 0101. When performing the NOT operation of the first string, the operand filter generated by the operand filter generator 122 may be used to mask the latter three strings. Similarly, for example, the operand filter may set the selecting bits to 1 for the first string, and the "don't care" (unselected, masked) bits may be set to 0 for the latter three strings. Therefore, the operand filter is 1000.

After that, in the page buffer 106B, as mentioned above, the existing latch inside the page buffer 106B is used to perform the AND operation between the operand 0101 and the operand filter 1000 to select the required bits. The selected operands becomes 0000.

After that, the pop-count counter 112 will count the bit 1 in the data of the selected operands transmitted from the page buffer 106B, which is 0000 in this example. The pop-count counter 112 adopts the existing error bit detector, so the pop-count counter 112 counts the number of bits with a value of 1. Under the conditions, the bitwise operation processing unit 130 will output the result of the NOT operation according to the number of 1 output by the pop-count counter 112. Here, if the counted number of 1 is 0, the output of the NOT operation is 1; conversely, if the counted number of 1 is greater than 0 (=1), the output of the NOT operation is 0.

TABLE 2-1

| Raw data (operands) | | | 0 | 1 | 0 | 1 |
|---|---|---|---|---|---|---|
| Read raw data | | | 0 | 1 | 0 | 1 |
| Operand filter | selecting bit = 1, masking bit = 0 | | 1 | 0 | 0 | 0 |
| Select operands | (raw data) AND (operand filter) | | 0 | 0 | 0 | 0 |
| Count bit 1 | =0 | >0 (=1) | Selected | Not | | |
| Output of NOT operation | 1 | 0 | | selected | | |

Table 2-2 illustrates another operation method of the NOT operator. This method is substantially similar to the method shown in Table 2-1, but when reading, the read raw operand is inversed for subsequent operations. The operand filter is also defined with the selecting bit being 1 and the masking bit being 0. However, in this example, if the counted number of 1 is 0, the output of the NOT operation is 0; conversely, if the counted number of 1 is greater than 0 (=1), the output of the NOT operation is 1.

TABLE 2-2

| Raw data (operands) | | | 0 | 1 | 0 | 1 |
|---|---|---|---|---|---|---|
| Read inversed raw data | | | 1 | 0 | 1 | 0 |
| Operand filter | selecting bit = 1, masking bit = 0 | | 1 | 0 | 0 | 0 |
| Select operands | (inversed raw data) AND (operands filter) | | 1 | 0 | 0 | 0 |
| Count bit 1 | =0 | >0 (=1) | Selected | Not | | |
| Output of NOT operation | 0 | 1 | | selected | | |

Next, take the AND operator shown in Table 3-1 as an example. In this example, in order to carry out AND bitwise operation, the operand filter defines the selecting bit as 0 and the masking bit as 1. Under the conditions, the bits of operand are selected by using the OR operation between the raw operand and the operand filter. Thereafter, in the pop-count counter 112, if the counted number of 1 is less than n (the total number of operands in the pop-count counter), the output of the AND operation is 0; otherwise, if the counted number is equal to n, the output of the AND operation is 1.

TABLE 3-1

| Raw data (operands) | | | 0 | 1 | 0 | 1 |
|---|---|---|---|---|---|---|
| Read raw data | | | 0 | 1 | 0 | 1 |
| Operand filter | selecting bit = 0, masking bit = 1 | | 0 | 0 | 1 | 1 |
| Select operands | (raw data) OR (operand filter) | | 0 | 1 | 1 | 1 |
| Count bit 1 | <n (n = 4 in this example) | =n (n = 4 in this example) | Selected | Not selected | | |
| Output of AND operation | 0 | 1 | | | | |

Table 3-2 illustrates another operation method of the AND operator. The method shown in Table 3-1 is different from other operation methods. For example, the selection operations of operands and operand filters are different. That is, when performing OR bitwise operation in Table 1, the selection operation of operand filter adopts AND, but when performing AND bitwise operation in Table 3-1, the selection operation of operand filter adopts OR. In addition, regarding the operand filter, when performing the OR bitwise operation in Table 1, the operands filter uses the selecting bit as 1 and the masking bit as 0. When performing AND bitwise operation in Table 3-1, the operand filter uses the selecting bit as 0 and the masking bit as 1.

However, the Table 3-2 uses the same conditions as the OR bitwise operation of Table 1. Namely, for the AND bitwise operation of Table 3-2, the operand filter uses the selecting bit as 1 and the masking bit as 0. In addition, the selection for the operand filer uses the AND operation rather than OR operation in Table 3-1. Namely, the conditions for the AND bitwise operation of Table 3-2 and the OR bitwise operation of Table 1 are consistent, and no different definitions are required. Therefore, the design can be further simplified. But in this AND bitwise operation in Table 3-2, the inverse raw data is used to perform operand selection with the operand filter, i.e. (inverse raw data) AND (operand filter).

TABLE 3-2

| | | | | | | |
|---|---|---|---|---|---|---|
| Raw data (operands) | | 0 | 1 | 0 | 1 | |
| Read inversed raw data | | 1 | 0 | 1 | 0 | |
| Operand filter | selecting bit = 1, masking bit = 0 | 1 | 1 | 0 | 0 | |
| Select operands | (inversed raw data) AND (operand filter) | 1 | 0 | 0 | 0 | |
| Count bit 1 | =0 | | >0 | Selected | Not selected | |
| Output of AND operation | 1 | | 0 | | | |

Next, take the XOR operator shown in Table 4 as an example. In this example, the operand filter defines the selecting bit as 1 and the masking bit as 0. Under the circumstances, the bits of operands are selected by using the AND operation of the raw operand and the operand filter. Thereafter, in the pop-count counter 112, if the counted number of 1 is an even number and the least significant bit (LSB) is 0, the output of the XOR operation is 0; conversely, if the counted number is an odd number and the least significant bit (LSB) is 1, then the output of the XOR operation is 1.

TABLE 4

| | | | | | | |
|---|---|---|---|---|---|---|
| Raw data (operands) | | | | | | |
| Read inversed raw data | | 0 | 1 | 0 | 1 | |
| Operand filter | selecting bit = 1, masking bit = 0 | 1 | 1 | 0 | 0 | |
| Select operands | (raw data) AND (operand filter) | 0 | 1 | 0 | 0 | |
| Count bit 1 | Even number, LSB = 0 | Odd number, LSB = 1 | Selected | Not selected | | |
| Output of XOR operation | 0 | 1 | | | | |

The above examples of NOT, OR, AND, XOR, and so on are given to illustrate how to use the page buffer 106B to perform bit masking of operands and how to use the error bit detector 112 as a pop-count counter to perform the in-memory bitwise operation. Based on the above explanation examples, those skilled in the art may similarly deduce the relationship between the operation results of various other logical operators and the counting of bit 1. Examples of each operator will not be described one by one here.

Accordingly, FIG. 5 is a diagram illustrating the relationship between the operation results of various logical operations, the operand filter and counting of bit 1 according to an embodiment of the present disclosure. FIG. 5 summarizes the relationship diagram 200 for various situations. As shown in FIG. 5, the logical operators listed here include NOT, OR, NOR, AND, NAND, XOR, XNOR and other operators. In FIG. 5, column 202 represents the method of reading the raw data (operands), column 204 represents the method of defining the operand filter, column 206 represents the specification for selecting operands, and column 208 represents the relationship between the counting result of bit 1 and the bitwise operation result.

It can be seen from FIG. 5 that no matter which operator it is, the operand filter 204 defines that the selecting bit is 1 and the masking bit is 0, wherein the read data 202 for the AND and NAND operators uses the inverse read. Therefore, the operand filter 204 may be consistent for various operators. In addition, regarding the operands selection rule 206, that is, which logical operation is used to mask non-selected bits, AND logical operation is adopted for all cases. In addition, other than the XOR and XNOR operators which adopt the least significant bit (LSB) being 0 or 1 to determine the bitwise operation result, the counting result of bit 1 and the bitwise operation result (logic output) all adopt the comparison between the counting result of bit 1 and 0. It can be seen from this that the embodiment of the disclosure may utilize the counting of bit 1 (error bit detection) to provide a consistent and concise bitwise operation.

Figure 6:
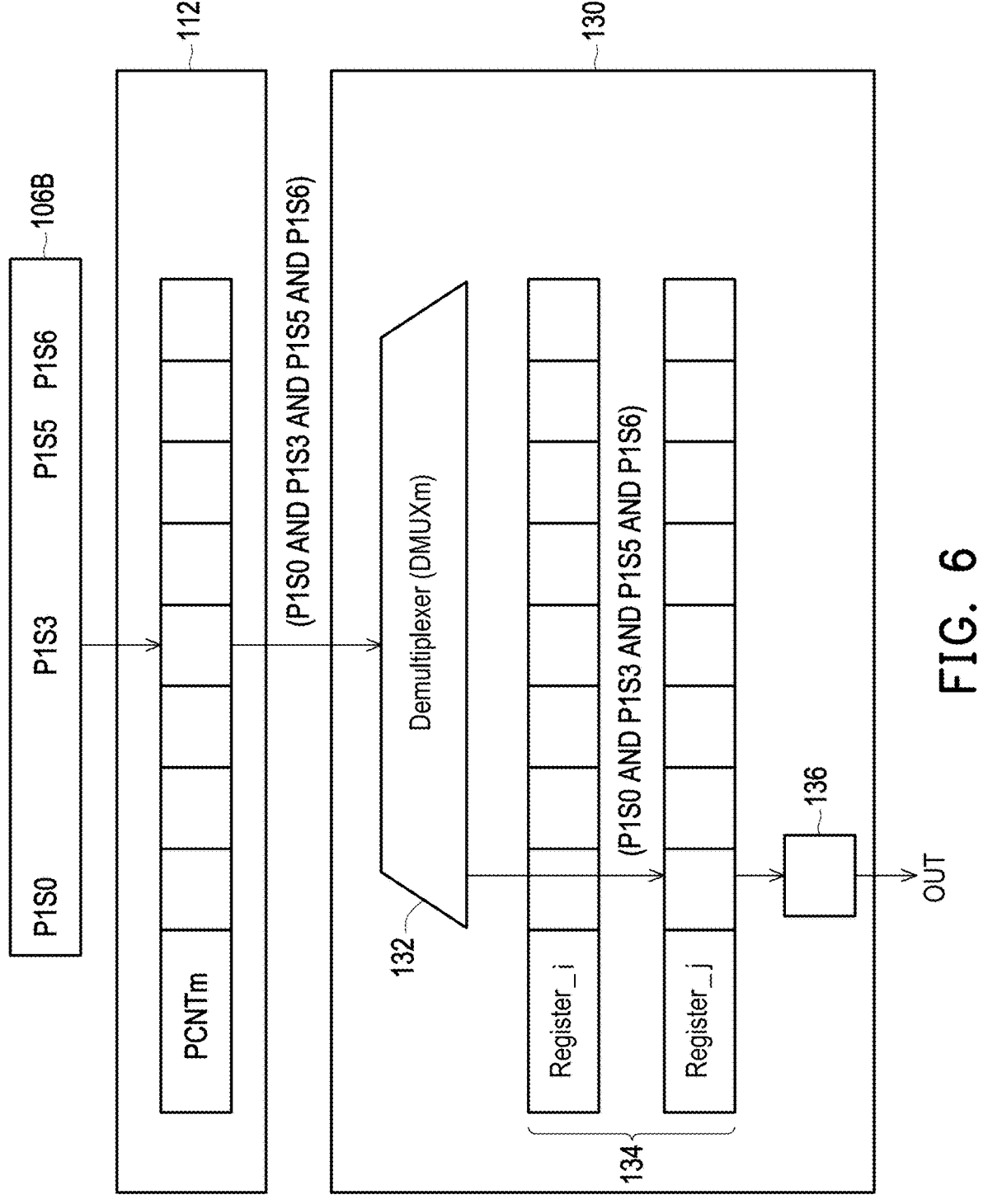
FIG. 6 is a diagram illustrating an operation example of performing a single level bitwise operation on the same page of data according to an embodiment of the present disclosure.

FIG. 6 is a diagram illustrating an operation example of performing a single level bitwise operation on the same page of data according to an embodiment of the present disclosure. In this example, the sense amplifier 106A reads the raw data of page P1 from the memory array 102, wherein the raw data of page P1 may include a plurality of strings. Then, the raw data of page P1 is transmitted to the page buffer 106B. Then, in the page buffer 106B, the operand filter is used to select specific strings in the raw page data P1 as operands to be subjected to the bitwise operations, such as the operands P1S0, P1S3, P1S5 and P1S6, etc., that is, different strings of data on the same page. In addition, FIG. 6 omits the denotation of the flags, and reference in this regard may be derived from the denotation shown in FIG. 4.

Afterwards, these operands P1S0, P1S3, P1S5 and P1S6 are transmitted to the pop-count counter 112 for AND bitwise operation, that is, the following logical operation formula.

(P1S0 AND P1S3 AND P1S5 AND P1S6)

The pop-count counter 112 counts the number of bit 1 according to the above method, and obtains the bitwise operation results of the operands according to the judgment method shown in FIG. 5.

Afterwards, the pop-count counter 112 transmits the bitwise operation result to the demultiplexer 132 of the bitwise operation processing unit 130. Because there is only one AND operator in this example, there will be no next operator (which may be derived according to the operator flag), the demultiplexer 132 transmits the bitwise operation result of the pop-count counter 112 to the register_j, and then to the output buffer 136. After receiving the final result flag (such as changing from 0 to 1), the output buffer 136 takes the bitwise operation result as the final result and outputs the bitwise operation output OUT.

Figure 7:
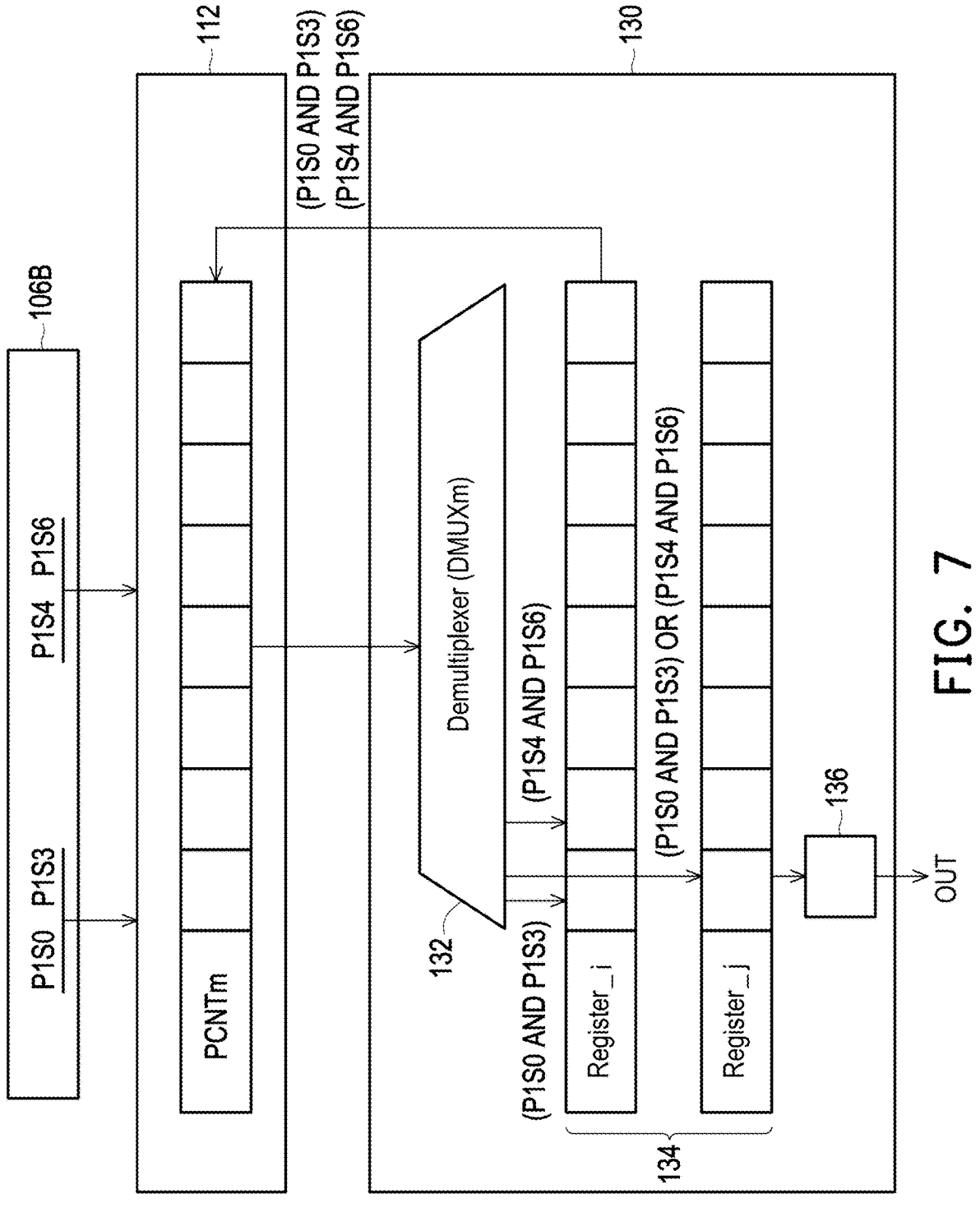
FIG. 7 is a diagram illustrating an operation example of performing multi-level bitwise operation on the same page of data according to an embodiment of the present disclosure.

FIG. 7 is a diagram illustrating an operation example of performing multi-level bitwise operation on the same page of data according to an embodiment of the disclosure. The example shown in FIG. 7 performs the following multi-level operations.

(P1S0 AND P1S3) OR (P1S4 AND P1S6)

Here, the denotation of reference numerals of operands is the same as in FIG. 6. In this bitwise operation, first the AND bitwise operation is performed on operands P1S0 and P1S3, then the AND bitwise operation is performed on operands P1S4 and P1S6, and finally the results of the two AND bitwise operations mentioned above are further subjected to the OR bitwise operation.

First, the page data P1 is read and stored in the page buffer 106B. Then the operand filter is used to select the strings S0 and S3, and the operands P1S0 and P1S3 are sent to the pop-count counter 112. Thereafter, the pop-count counter 112 counts the number of bit 1 and obtains the AND bitwise operation results of operands P1S0 and P1S3. Then, the pop-count counter 112 transmits the AND bitwise operation results of the operands P1S0 and P1S3 to the demultiplexer 132 of the bitwise operation processing unit 130. The demultiplexer 132 may transmit the AND bitwise operation result to the first bit (the leftest) in the register_i according to the register location flag (also refer to FIG. 4).

Next, the AND bitwise operation of operands P1S4 and P1S6 is processed. Because operands P1S4 and P1S6 and operands P1S1 and P1S3 belong to the same page P1, there is no need to read them from the memory array 102 again. Under the situations, it is only necessary to update the operand filter in the page buffer 106B to select strings S4 and S6. Then, the operands P1S4 and P1S6 are sent to the pop-count counter 112 to count the number of bit 1 to obtain the AND bitwise operation result of the operands P1S4 and P1S6. Then, the pop-count counter 112 transmits the AND bitwise operation results of the operands P1S4 and P1S6 to the demultiplexer 132 of the bitwise operation processing unit 130. The demultiplexer 132 may transmit the AND bitwise operation result to the next bit of the register_i according to the register location flag (also refer to FIG. 4).

Then, based on the operands flag, it can be known that there is a next operator. Under the situations, the above two AND bitwise operation results stored in the register_i are sent to the pop-count counter 112, and the OR bitwise operation of the above two AND bitwise operation results is obtained based on the OR operator again.

Afterwards, the OR bitwise operation results of the operands (P1S0 AND P1S3) and (P1S4 AND P1S6) are sent to the demultiplexer 132 of the bitwise operation processing unit 130. Because it can be known that this OR operator is the last operator based on the operator flag, the demultiplexer 132 transmits the bitwise operation result of the pop-count counter 112 to the register_j, and then to the output buffer 136. After receiving the final result flag (such as changing from 0 to 1), the output buffer 136 takes the bitwise operation result as the final result and outputs the bitwise operation output OUT.

Figure 8:
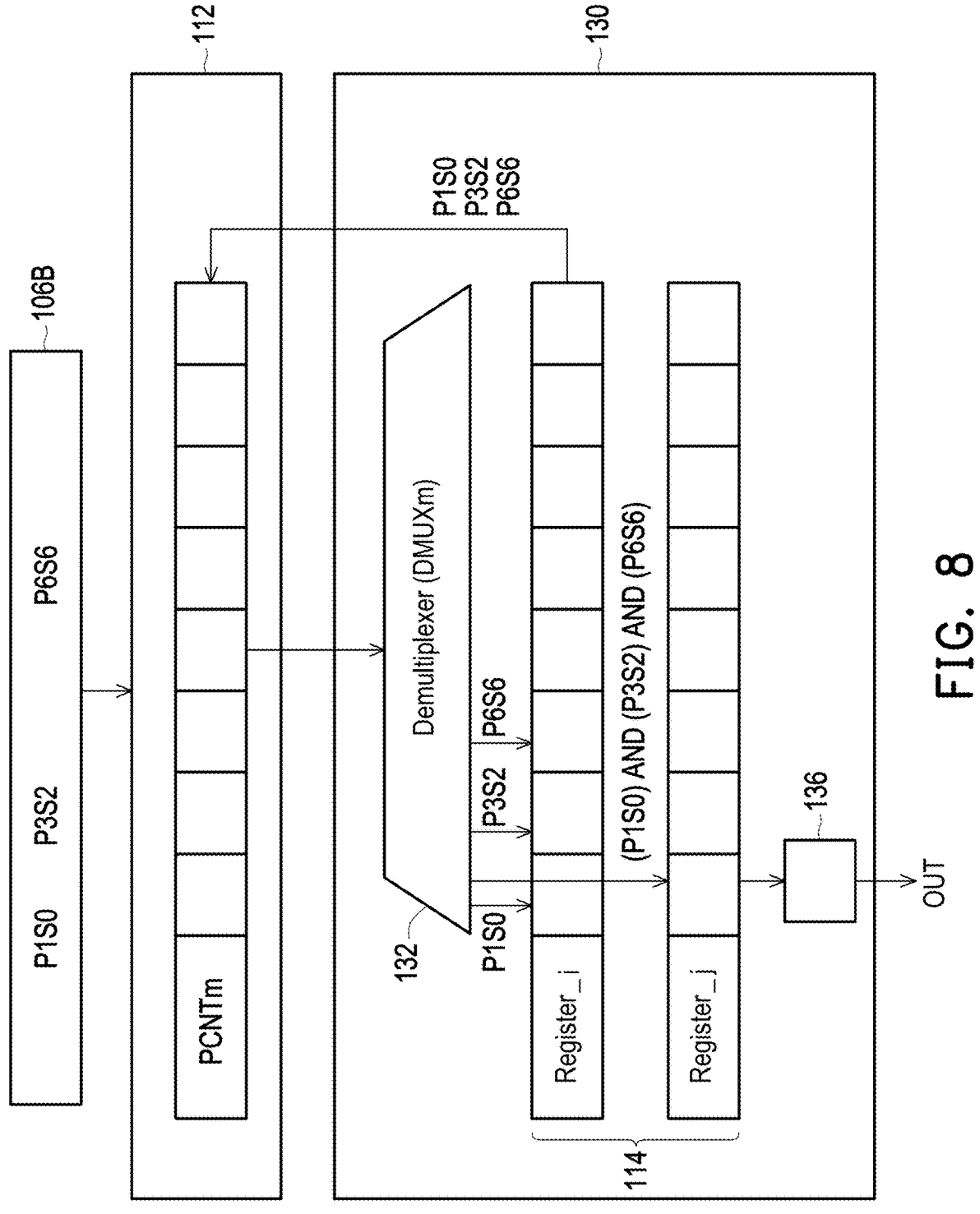
FIG. 8 is a diagram illustrating an operation example of performing a single level bitwise operation on different pages of data according to an embodiment of the present disclosure.

FIG. 8 is a diagram illustrating an operation example of performing a single level bitwise operation on different pages of data according to an embodiment of the present disclosure. In the above examples, bitwise operations are performed on the same page of data. Next, an example of bitwise operation using different pages of data is explained. The example shown in FIG. 8 performs the following single level operation. Here, the denotation of reference numerals of operands is the same as in FIG. 6.

$$(P1S0) \ AND \ (P3S2) \ AND \ (P6S6)$$

In this bitwise operation, since the page data are on different pages, and thus it is necessary to read each page of data separately.

First, the page data P1 is read and stored in the page buffer 106B, and then the operand filter is used to select the string S0 as the operand P1S0, and then transmitted to the pop-count counter 112. Afterwards, the pop-count counter 112 transmits the operand P1S0 to the demultiplexer 132 of the bitwise operation processing unit 130. The demultiplexer 132 may transmit the operand P1S0 to the first bit in the register_i according to the register location flag (also refer to FIG. 4).

Similarly, page data P3 is then read and stored in the page buffer 106B, and then the string S2 is selected using the another operand filter as the operand P3S2, and then transmitted to the pop-count counter 112. Then, the pop-count counter 112 transmits the operand P3S2 to the demultiplexer 132 of the bitwise operation processing unit 130. The demultiplexer 132 may transmit the operand P3S2 to the second bit in the register_i according to the register location flag. Similarly, page data P6 is then read and stored in the page buffer 106B, and then the string S6 is selected using another operand filter as the operand P6S6, and then transmitted to the pop-count counter 112. Then, the pop-count counter 112 transmits the operand P6S6 to the demultiplexer 132 of the bitwise operation processing unit 130. The demultiplexer 132 may transmit the operand P6S6 to the third bit in the register_i according to the register location flag.

Thereafter, each operand P1S0, P3S2, and P6S6 in the register_i is transmitted to the pop-count counter 112. The pop-count counter 112 performs an AND bitwise operation with operands P1S0, P3S2, and P6S6 based on the operator flag. Afterwards, the pop-count counter 112 transmits the AND bitwise operation result to the demultiplexer 132 of the bitwise operation processing unit 130. Because it can be known that the AND operator is the last operator based on the operator flag, the demultiplexer 132 transmits the bitwise operation result of the pop-count counter 112 to the register_j, and then to the output buffer 136. After receiving the final result flag (such as changing from 0 to 1), the output buffer 136 takes the bitwise operation result as the final result and outputs the bitwise operation output OUT.

Figure 9:
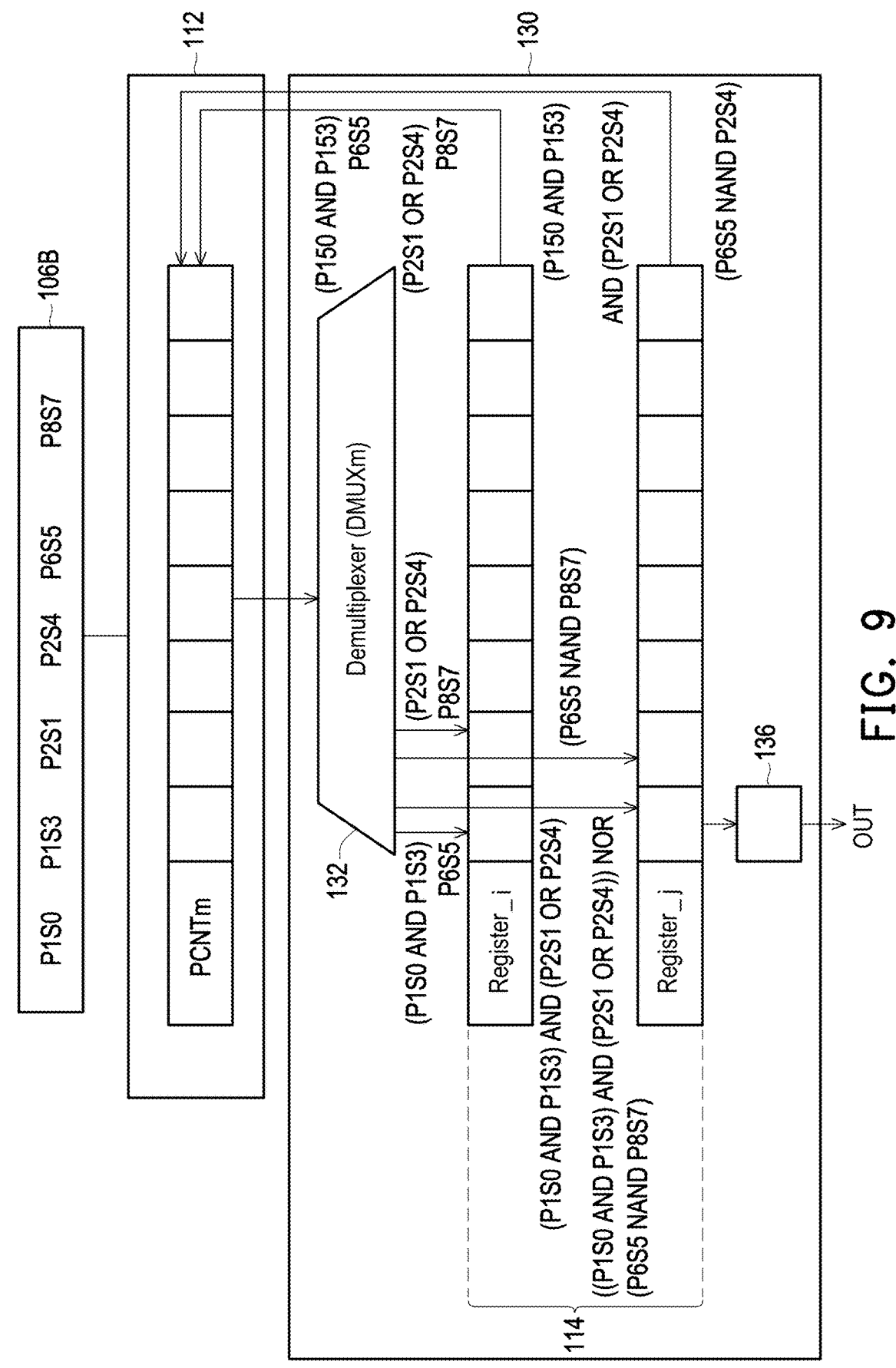
FIG. 9 is a diagram illustrating an operation example of performing a multi-level bitwise operation on different pages of data according to an embodiment of the present disclosure.

FIG. 9 is a diagram illustrating an operation example of performing a multi-level bitwise operation on different pages of data according to an embodiment of the present disclosure. Next, an example of bitwise operation using different pages of data is explained. The example shown in FIG. 9 performs the following multi-level operation. Here, the denotation of reference numerals of operands is the same as in FIG. 6.

$$(P1S0 \ AND \ P1S3) \ AND \ (P2S1 \ OR \ P2S4) \ NOR$$
$$(P6S5 \ NAND \ P8S7)$$

In this bitwise operation, since the page data are on different pages, and thus it is necessary to read each page of data separately.

First, the page data P1 is read and stored in the page buffer 106B. Then the operand filter is used to select the strings to be operated in the page data P1, such as P1S0 and P1S3, and the operands P1S0 and P1S3 are sent to the pop-count counter 112 to perform the AND bitwise operation, i.e., the logic operation of (P1S0 AND P1S3).

Then, the pop-count counter 112 transmits the bitwise operation results to the demultiplexer 132 of the bitwise operation processing unit 130. The demultiplexer 132 may transmit the AND bitwise operation result to the first bit (the leftest) in the register_i according to the register location flag (also refer to FIG. 4).

Next, the page data P2 is read and stored in the page buffer 106B. Then the operand filter is used to select the strings to be operated in the page data P2, such as P2S1 and P2S4, and the operands P2S1 and P2S4 are sent to the pop-count counter 112 to perform the OR bitwise operation, i.e., the logic operation of (P2S1 OR P2S4).

Then, the pop-count counter 112 transmits the bitwise operation results to the demultiplexer 132 of the bitwise operation processing unit 130. The demultiplexer 132 may transmit the OR bitwise operation result to the next (the second) bit in the register_i according to the register location flag.

The operation result of (P1S0 AND P1S3) and the operation result of (P2S1 OR P2S) in the register_i are then delivered to the pop-count counter 112 to perform the AND bitwise operation, i.e., the logic operation of (P1S0 AND P1S3) AND (P2S1 OR P2S4). Then, the pop-count counter 112 transmits the bitwise operation results to the demultiplexer 132 of the bitwise operation processing unit 130. The demultiplexer 132 may transmit the AND bitwise operation result to the first (the leftest) bit in the register_j according to the register location flag.

Next, the page data P6 is read and stored in the page buffer 106B. Then the operand filter is used to select the strings to be operated in the page data P6, such as P6S5. Since the next operand is at a different page, the operand P6S5 is first transmitted to the demultiplexer 132 of the bitwise operation processing unit 130. The demultiplexer 132 may transmit the operand P6S5 to the first (the leftest) bit in the register_i according to the register location flag.

Then, the page data P8 is read and stored in the page buffer 106B. Then the operand filter is used to select the strings to be operated in the page data P8, such as P8S7. Similarly, the operand P8S7 is also transmitted to the demultiplexer 132 of the bitwise operation processing unit 130. The demultiplexer 132 may transmit the operand P8S7 to the second bit in the register_i according to the register location flag.

Then, the operands P6S5 and P8S7 are then delivered to the pop-count counter 112 to perform the NAND bitwise operation, i.e., the logic operation of (P6S5 NAND P8S7). Then, the pop-count counter 112 transmits the bitwise operation results to the demultiplexer 132 of the bitwise operation processing unit 130. The demultiplexer 132 may transmit the NAND bitwise operation result to the next (the second) bit in the register_j according to the register location flag.

Next, the operation result of (P1S0 AND P1S3) AND (P2S1 OR P2S4) and the operation result of (P6S5 NAND P8S7) in the register_j are then delivered to the pop-count counter 112 to perform the NOR bitwise operation, i.e., the logic operation of ((P1S0 AND P1S3) AND (P2S1 OR P2S4)) NOR (P6S5 NAND P8S7). Then, the pop-count counter 112 transmits the bitwise operation results to the demultiplexer 132 of the bitwise operation processing unit 130. The demultiplexer 132 may transmit the NOR bitwise operation result to the first (the leftest) bit in the register_j according to the register location flag.

Then, it can be known that the NOR operator is the last operator based on the operator flag, the demultiplexer 132 transmits the bitwise operation result of the pop-count counter 112 to the register_j, and then to the output buffer 136. After receiving the final result flag (such as changing from 0 to 1), the output buffer 136 takes the bitwise operation result as the final result and outputs the bitwise operation output OUT.

The descriptions illustrated in FIG. 6 to FIG. 9 include single level bitwise operations with the same page of data, multi-level bitwise operations with the same page of data, single level bitwise operations with different pages of data, and multi-level bitwise operations with different pages of data. Those skilled in the art can combine various variations based on these examples.

FIG. 10 is an operation flow chart of an in-memory bitwise operation according to an embodiment of the present disclosure. The following is explained with reference to FIG. 1 and FIG. 4. As shown in FIG. 10, first in step S100, information about operands and operators is input. For example, information about operands and operators is received from the I/O unit 104 shown in FIG. 1. The information about operands is, for example, the address of the operands stored in the memory array 102, such as a page address. As mentioned previously, a page address may refer to a (layer of) word line in the memory array 102. A page may contain multiple strings (vectors), each string may be used as an operand, and each operand (string) may contain multiple bits.

In addition, the information about operators may be provided to the logical operation mode unit 120. The logical operation mode unit 120 may generate corresponding operator flags. Based on the operator flag, it is possible to know what logical operations are to be performed on operands. In addition, the operator flag may also be used to determine whether there is a next operator in the entire bitwise operation, thereby determining whether to end the bitwise operation.

In step S102, the operands are read from the memory array 102. As mentioned before, operands are read in unit of pages. The sensed page data will be temporarily stored in the page buffer 106B. As previously mentioned, the page buffer 106B may include a plurality of page buffer units PBm. The corresponding bit position in each string of the read page data will be put into each page buffer unit PBm (refer to the description of FIG. 3A and FIG. 3B).

In step S104, the operands are selected. Because when performing bitwise operations, not all strings in a page are necessarily used for bitwise operations. Here, after the operands are stored in the page buffer 106B, the operand filter generated by the operand filter generator 122 may be used to filter the operands. As shown in FIG. 2, the operand filter may mask certain strings in a page data.

In step S106, the corresponding bit positions in each operand are counted by counting of bit 1 to perform a bitwise operation. As mentioned above, after the page buffer 106B selects the operands, the selected operands are transmitted to the pop-count counter (i.e., the error bit detector) 112. As illustrated in FIG. 2, the pop-count counter 112 counts bit 1 on the corresponding bits in each operand to generate a bitwise operation result.

In step S108, the bitwise operation result is transmitted to the register. As described above in FIG. 4, the bitwise operation result is transmitted to the demultiplexer 132 of the bitwise operation processing unit 130 by the pop-count counter 112. Afterwards, the demultiplexer 132 will transmit the bitwise operation result into the register 134.

In step S110, it is determined whether an operator is the last operator. When it is determined that the operator is the last operator, step S130 is executed, and the bitwise operation result stored in the register 134 is output as the final bitwise operation result.

When step S110 determines that the operator is not the last operator, step S112 is executed. Step S112 determines whether there is a next operand. When step S112 determines that there is the next operand, the process returns to step S102 and continues to read the next operands from the memory array 102. After that, steps S102 to S110 are continued. On the contrary, when step S112 determines that there is no next operand, because there is another operator at this time, the bitwise operation result previously stored in the register still needs to be used. Therefore, step S114 transmits the bitwise operation results previously stored in the register as new operand to the pop-count counter 112, and executes step S106 to continue the bitwise operation of the next operator until all operators complete the bitwise operation.

In summary, the in-memory bitwise operation in the embodiments of the present disclosure uses the existing reading method to read the required operand (page data), and uses the existing error bit counter as the pop-count counter to perform bitwise operation. Therefore, it is possible to achieve the technical purpose of computing in memory with only slight degree of modification to the existing memory architecture without having to significantly redesign the existing memory architecture and operation methods. In this way, it is possible to significantly reduce the cost of redesign and effectively perform computing in memory.

What is claimed is:

1. An in-memory bitwise operation circuit, comprising:
a memory array, having a plurality of page data, each of the plurality of page data has a plurality of strings;
a page buffer, storing the plurality of strings and selecting a portion of the plurality of strings as a plurality of operands;
a pop-count counter, receiving the plurality of operands and an operator flag, counting a number of bit 1 at corresponding bit positions of each of the plurality of operands based on the operator flag, and generating a bitwise operation result of an operator corresponding to the operator flag; and
a bitwise operation processing unit, receiving and temporally storing the bitwise operation result, and outputting a final bitwise operation result when receiving a final result flag,
wherein when the operator is a last operator, the bitwise operation result is output as the final bitwise operation result, and
when the operator is not the last operator, the bitwise operation result is transmitted to the pop-count counter, so that the pop-count counter continues to perform bitwise operations for a next operator,
wherein the pop-count counter further comprises a plurality of pop-count counter units, and each of the plurality of pop-count counter units performs a bitwise operation on each of the corresponding bit positions in the plurality of operands.

2. The in-memory bitwise operation circuit according to claim 1, wherein the page buffer further comprises a plurality of page buffer units, and each of the plurality of page buffer units is configured to store the corresponding bit positions in each of the plurality of operands.

3. The in-memory bitwise operation circuit according to claim 2, wherein each of the plurality of pop-count counter units corresponds to each of the plurality of page buffer units one by one.

4. The in-memory bitwise operation circuit according to claim 3, wherein the bitwise operation processing unit further comprises a plurality of processing units, each of the plurality of processing units corresponds to each of the plurality of pop-count counter units respectively,
each of the plurality of processing units further comprises:
a demultiplexer, receiving the bitwise operation result output from the corresponding pop-count counter unit;
a plurality of registers, coupled to the demultiplexer, wherein the demultiplexer transmits the bitwise operation result to one of the plurality of registers; and
an output buffer, temporarily storing the final bitwise operation result, and when receiving the final result flag, outputting the final bitwise operation result,
wherein when the operator is the last operator, the bitwise operation result is transmitted to another one of the plurality of registers, and the bitwise operation result is used as the final bitwise operation result,
when the operator is not the last operator, the bitwise operation result stored in the one of the plurality of registers is transmitted to the pop-count counter.

5. The in-memory bitwise operation circuit according to claim 1, further comprising:
a logical operation mode unit, generating the operator flag based on an operation instruction for the operator input from the outside, and providing the operator flag to the page buffer, the pop-count counter and the bitwise operation processing unit.

6. The in-memory bitwise operation circuit according to claim 1, further comprising:
an operand filter generator, generating an operand filter based on a filter instruction input from the outside, wherein the operand filter is configured to select the plurality of strings for each of the plurality of page data.

7. The in-memory bitwise operation circuit according to claim 6, wherein selecting the plurality of strings is configured to perform a predetermined logical operation on each of the plurality of strings and the corresponding operand filter, so as to mask all or part of the bits in each of the plurality of strings.

8. The in-memory bitwise operation circuit according to claim 6, further comprising a cache memory, wherein the operand filter is first temporarily stored in the cache memory,
in response to selecting the plurality of strings, the operand filter stored in the cache memory is provided to the page buffer.

9. The in-memory bitwise operation circuit according to claim 7, wherein the predetermined logical operation is an AND operation, and bit 1 is used as a selecting bit, and bit 0 is used as a masking bit.

10. The in-memory bitwise operation circuit according to claim 1, wherein the pop-count counter is configured by an error bit detector.

11. The in-memory bitwise operation circuit according to claim 10, wherein the error bit detector is an analog type of error bit detector or a digital type of error bit detector.

12. The in-memory bitwise operation circuit according to claim 1, further comprising an external operand selector, wherein the external operand selector selects the plurality of strings based on a filter input instruction from the outside to generate the plurality of operands.

13. The in-memory bitwise operation circuit according to claim 1, wherein the memory array is a two-dimensional or three-dimensional flash memory array.

14. An in-memory bitwise operation method, executed in a memory device, wherein the memory device comprises a pop-count counter, and the pop-count counter further comprises a plurality of pop-count counter units, wherein the in-memory bitwise operation method comprises:
reading at least one page data having a plurality of strings from a memory array in the memory device;
selecting a portion of the strings from the plurality of strings as a plurality of operands;
based on an operator to be executed, counting, by the pop-count counter, a number of bit 1 at corresponding bit positions of each of the plurality of operands, and generating a bitwise operation result corresponding to the operator, wherein each of the plurality of pop-count counter units performs a bitwise operation on each of the corresponding bit positions in the plurality of operands;
receiving and temporally storing the bitwise operation result, wherein when the operator is a last operator, the bitwise operation result is output as a final bitwise operation result; and
when the operator is not the last operator, the bitwise operation result is continuously used as an operand for a next operator to perform the counting of the number of bit 1, and a bitwise operation of the next operator is continued.

15. The in-memory bitwise operation method according to claim 14, further comprising:

determining whether there are next operands when the operator is not the last operator; and reading another page data from the memory array to generate the next operands when there is the next operand.

16. The in-memory bitwise operation method according to claim 14, wherein the memory device further comprises a page buffer, and the page buffer further comprises a plurality of page buffer units, reading the plurality of strings of the at least one page data from the memory array further comprises:

storing the corresponding bit positions in each of the plurality of strings respectively in each of the plurality of page buffer units.

17. The in-memory bitwise operation method according to claim 14, wherein selecting a portion of the strings from the plurality of strings as the plurality of operands further comprises:

generating an operand filter based on an instruction input from the outside of the memory device, wherein the operand filter is configured to select the plurality of strings.

18. The in-memory bitwise operation method according to claim 17, wherein selecting the plurality of strings is configured to perform a predetermined logical operation on each of the plurality of strings and the corresponding operand filter, so as to mask all or part of the bits in each of the plurality of strings.

19. The in-memory bitwise operation method according to claim 18, wherein the predetermined logical operation is an AND operation, and bit 1 is used as a selecting bit, and bit 0 is used as a masking bit.

20. The in-memory bitwise operation method according to claim 14, wherein the memory array is a two-dimensional or three-dimensional flash memory array.

* * * * *